United States Patent [19]
Cockerham et al.

[11] Patent Number: 6,076,756
[45] Date of Patent: Jun. 20, 2000

[54] SUPERELASTIC, LIGHTWEIGHT BAIL WIRE FOR SPINNING FISHING REELS

[75] Inventors: Rayford A. Cockerham, Broken Arrow; Carl J. Berendt, Afton; William B. Johnson, Tulsa, all of Okla.

[73] Assignee: Brunswick Corporation, Lake Forest, Ill.

[21] Appl. No.: 09/311,945

[22] Filed: May 14, 1999

[51] Int. Cl.[7] .................................................. A01K 89/01
[52] U.S. Cl. .......................... 242/231; 428/364; 428/379
[58] Field of Search .................................... 242/230, 231, 242/232, 233; 428/364, 375, 379, 386; 43/17.1

[56] References Cited

U.S. PATENT DOCUMENTS

| | | |
|---|---|---|
| 4,874,144 | 10/1989 | Murakami . |
| 4,884,761 | 12/1989 | Kuntze . |
| 4,895,438 | 1/1990 | Zider et al. . |
| 5,203,103 | 4/1993 | Hawley ..................................... 43/17.1 |
| 5,547,140 | 8/1996 | Kawabe et al. . |
| 5,586,734 | 12/1996 | Kawabe et al. . |
| 5,637,089 | 6/1997 | Abrams et al. . |

OTHER PUBLICATIONS

Hodgson, Darel E., Ming H. Wu and Robert J. Biermann. "Shape Memory Alloys." Printed from www.sma–inc.com on Apr. 13, 1999, pp. 1–12.

Kauffman, George B. and Issac Mayo. "The Metal with a Memory: A combination of accident, luck, and hard work produced nitinol, an advanced 'intelligent' metal." *Invention & Technology*. Fall 1993, pp. 18–23.

Kauffman, George B. and Issac Mayo. "The Story of Nitinol: The Serendipitous Discovery of the Memory Metal and Its Application." *The Chemical Educator*. 1996. vol. 2, No. 2, pp. 1–21.

NDC: Nitinol Devices and Components. Nitinol Applications. Printed from www.nitinol.com on Apr. 13, 1999, pp. 1–8.

NDC: Nitinol Devices and Components. Nitinol Technology. Printed from www.nitinol.com on Apr. 13, 1999, pp. 1–3.

NiTi Smart Sheet. No. 1. Glossary of NiTi Terminology. Printed from www.sma–inc.com on Apr. 13, 1999, pp. 1–2.
NiTi Smart Sheet. No. 2. Introduction to Shape Memory and Superelasticity. Printed from www.sma–inc.com on Apr. 13, 1999, pp. 1–2.
NiTi Smart Sheet. No. 6. Setting Shapes in NiTi. Printed from www.sma–inc.com on Apr. 13, 1999, pp. 1.
NiTi Smart Sheet. No. 13. Specifying NiTi Materials. Printed from www.sma–inc.com on Apr. 13, 1999, pp. 1–6.
Shape Memory Applications, Inc. NiTi Materials, Components, and Development Services. Printed from www.sma–inc.com on Apr. 13, 1999, pp. 1–2.

*Primary Examiner*—Katherine A. Matecki
*Attorney, Agent, or Firm*—Fellers, Snider, Blankenship, Bailey & Tippens, P.C.

[57] ABSTRACT

The present invention provides a super-elastic, lightweight bail wire in combination with a bail assembly for use in connection with spinning-type fishing reels. In one preferred aspect, the bail wire has a modulus of elasticity (E) and a moment of inertia (I) whose product (E×I) is equal to or less than 45 lbs.-in.$^2$. In another preferred aspect, the bail wire has a weight per unit length equal to or less than $1.0 \times 10^{-3}$ lbs./in. Both aspects of the invention are achieved in an austenitic nickel-titanium alloy bail wire.

22 Claims, 2 Drawing Sheets

SUPERELASTIC, LIGHTWEIGHT BAIL WIRE FOR SPINNING FISHING REELS

BACKGROUND OF THE INVENTION

1. Field of the Invention

This invention relates to fishing reels having a rotor with an associated bail assembly for wrapping line onto a spool, and, more particularly, to a super-elastic, lightweight bail wire in combination with the bail assembly.

2. Background

One well known style of fishing reel is the spinning-type fishing reel. A spinning reel typically has a housing with an oscillating spool at its forward end. A rotor rotates about the spool axis by cooperative movement of a crank handle and has an associated bail assembly that wraps line onto the oscillating spool. In one construction, the rotor has integrally formed ears at diametrically opposite locations that define a support for a pair of bail arms between which a U-shaped bail wire is connected.

The bail wire has three basic functions. One function involves converting the reel from a cast mode to a retrieve mode as the bail assembly shifts from an open, line casting position to a closed, line winding position. As the reel handle is turned the bail assembly assumes the closed position and thereafter provides a smooth transition of line from the edge of the bail wire over a line roller and onto the spool. Not much stiffness is required of the bail wire to achieve this function.

The second function also relates to the conversion from cast to retrieve mode and is required when the bail assembly opening and closing systems are on opposite ears of the rotor. Usually in this case an over-center spring acts against one of the bail arms to hold the bail assembly in the open position while a kick lever acts against the other bail arm upon the initial rotation of the reel handle to trip the bail assembly to the closed position. The bail wire serves to locate the two bail arms relative to each other, holding the two bail arms in the same angular position and causing the entire bail assembly to rotate as a single piece. Consequently, the bail wire must possess sufficient stiffness to overcome the biasing force of the over-center spring.

The third function of the bail wire involves the conversion from retrieve mode to cast mode. Here, the bail wire acts as a handle or lever which the user grasps and pulls in order to move the bail assembly into the open position. Sufficient stiffness must be present in the bail wire not only to cause both bail arms to rotate to the open position but also to resist overly rugged handling by the user.

The bail wire is typically one of the most complicated, and most susceptible to damage, components in a spinning reel. Damage generally occurs due to an accidental loading of the bail wire during shipping, storage or actual use. When the bail wire becomes mis-shaped several potential problems arise. The bail arms may bind and no longer freely rotate relative to the rotor, resulting in an increase of force required to open or close the bail. Binding also may prevent the bail arms from traveling to their fully closed position causing line twisting at the line roller. On reels having opening and closing systems on opposite sides of the rotor, a mis-shaped bail wire also may prevent the proper tripping of the bail assembly to its closed position or may allow the bail assembly to prematurely close during casting.

Since the magnitude of accidental loads are quite unpredictable, the strength required in the bail wire is also unpredictable. To minimize the frequency of bail-related failures, existing reels have been designed with extremely rigid bail wires to withstand very high loads with minimal deflection. A rigid bail wire, though, is more likely to absorb a high accidental load due to its inability to shift positions to escape the load. In addition, any load absorbed by a rigid bail wire is directly transmitted to the bail wire support structure, thereby potentially damaging the support structure.

As bail wires have been designed to be stronger to avoid deformation, they have become heavier. The weight of the bail wire adversely affects the rotational balance of the rotor assembly. It is one objective of designers of spinning reels to design a rotor assembly that operates smoothly. To achieve this end, the rotor assembly must be dynamically balanced. In the absence of proper balancing, the rotor assembly, which may be operated at relatively high speeds, wobbles detectably. The largest forces to be balanced are developed by the bail wire. It is conventional to add weight to the opposite side of the rotor so as to balance the reel, but doing so results in a heavier and more complex reel. The weight of the bail wire also tends to cause the bail assembly to close during the cast. To prevent this from occurring additional torque must be applied to the bail assembly by a spring (or a magnet) to hold it open during the cast. This extra torque must be overcome to close the bail by cranking the reel handle when converting from cast to retrieve modes.

There is thus a need for a spinning reel having a bail wire more resistant to accidental loadings and damage resulting therefrom.

There is a further need for a lightweight bail wire in a spinning reel to simplify rotor balancing and facilitate ease of operation.

SUMMARY OF THE INVENTION

The present invention provides a super-elastic, lightweight bail wire in combination with a bail assembly for use in connection with spinning-type fishing reels. The inventive bail wire provides enough stiffness to accommodate the basic functions of a bail wire, but has enough flexibility to allow temporary deflections in the bail wire. Because it is flexible the bail wire can more easily move to avoid bearing the entire force of an accidental load. The elastic property of the inventive bail wire also serves to dampen load forces transmitted to the bail wire support structure. This allows for a more conservative, lightweight design of the support structure. The light weight of the bail wire itself also provides for beneficial balancing and operational characteristics.

The inventive bail wire is implemented in a spinning-type fishing reel having a housing with an oscillating spool at its forward end, a crank handle mounted on the housing, a rotor mounted for rotation about the spool by cooperative movement of the handle, and a bail assembly that wraps fishing line onto the oscillating spool. The bail assembly includes a pair of bail arms fixedly attaching respective ends of a U-shaped bail wire.

In one aspect of the invention, the bail wire is preselected by material composition and processing to possess a modulus of elasticity (E) and a moment of inertia (I) whose product (E×I) is equal to or less than 45 lbs.-in.$^2$ In a most preferred embodiment, the inventive bail wire possesses a product of (E×I) of approximately 5 lbs.-in.$^2$ as derived from the multiplicands of $8 \times 10^6$ psi (E) and $6.4 \times 10^{-7}$ in.$^4$ (I).

In another aspect of the invention, the bail wire is preselected by material composition and processing to have a weight per unit length equal to or less than $1.0 \times 10^{-3}$ lbs./in., and, most preferably, of about $0.7 \times 10^{-3}$ lbs./in.

Meeting the foregoing criteria, and particularly preferred, is a cylindrical bail wire comprising a nickel-titanium alloy locked in its austenitic form throughout an effective temperature range of use, and, most preferred, a nickel titanium alloy consisting essentially of 55–56 weight percent nickel and 44–45 weight percent titanium and having a diameter of about 0.06 in, a transition temperature of about −25° C. and exhibiting superelasticity in a temperature range of between −25° C. and 40° C.

A better understanding of the present invention, its several aspects, and its objects and advantages will become apparent to those skilled in the art from the following detailed description, taken in conjunction with the attached drawings, wherein there is shown and described the preferred embodiment of the invention, simply by way of illustration of the best mode contemplated for carrying out the invention.

DETAILED DESCRIPTION OF THE PREFERRED EMBODIMENT

Figure 1:
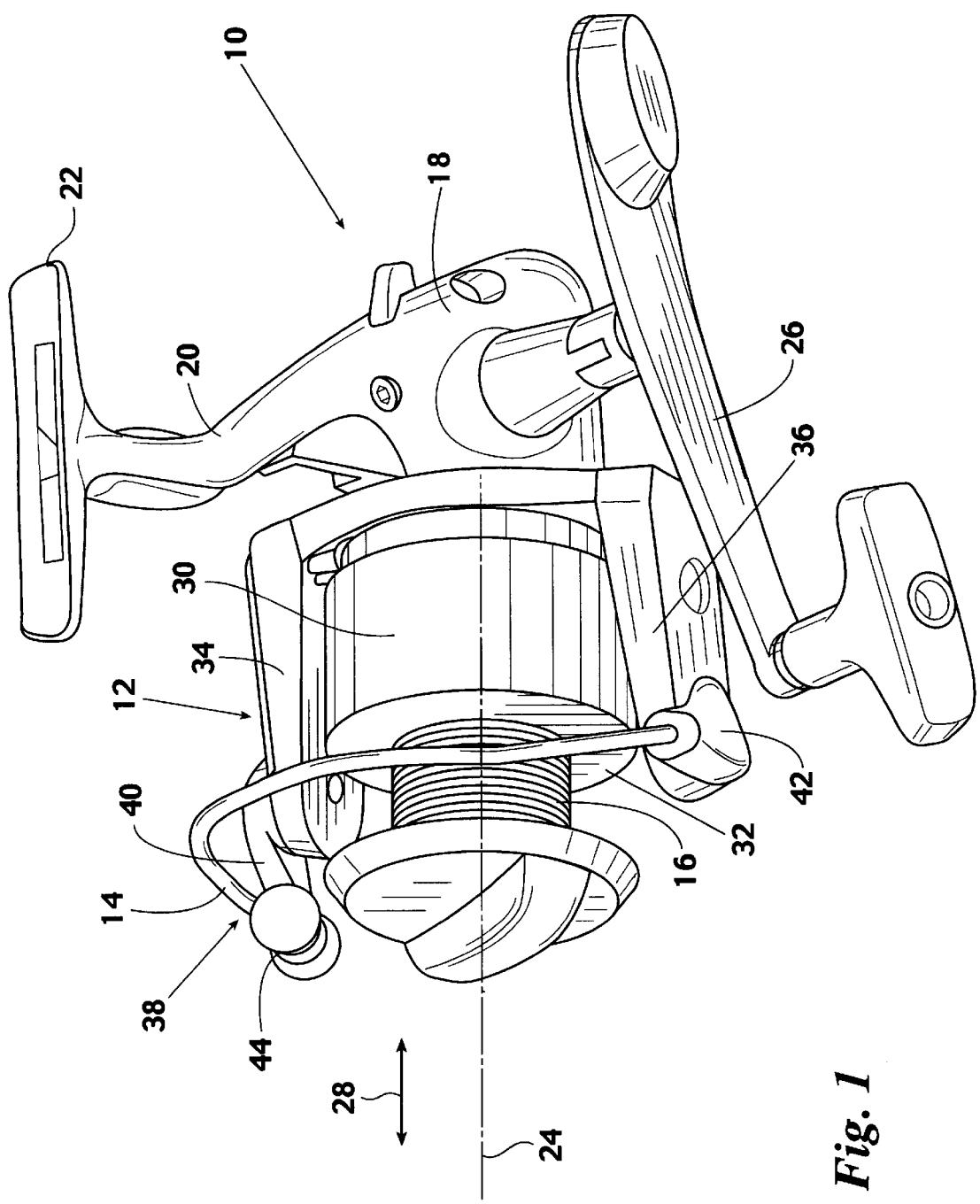
FIG. 1 shows a perspective view of a spinning type fishing reel and is exemplary of the environment of the present invention.

Referring now to FIG. 1, a spinning-type fishing reel, according to the present invention, is shown at 10. The focus of the present invention is on the rotor 12, and more specifically the bail wire 14, which is operable to wrap a supply of line around a spool 16 at the front of the reel 10. It should be understood that the reel 10 described herein is only exemplary of the environment for the invention. Many variations in the configuration of the reel 10 shown are contemplated by the invention.

The reel 10 has a main housing 18 which encases an operating mechanism (not shown). The housing 18 has an integrally formed stem 20 which terminates at a foot 22 which is attachable to a fishing rod (not shown) by conventional means.

The rotor 12 is rotated about a central longitudinal axis 24 by a crank handle 26 which is interrelated to the operating mechanism. As this occurs, the rotor 12 wraps the line continuously about the spool 16. The operating mechanism includes structure for oscillating the spool 16 in a fore and aft direction, as indicated by the double-headed arrow 28, as the rotor 12 rotates, to thereby assure that the line is evenly distributed along the axial extent of the spool 16.

The rotor 12 has a skirt 30, a spool shoulder 32 and diametrically, oppositely located first and second ears 34, 36, which cooperatively define a support for a movable bail assembly 38. The bail assembly 38 has a first bail arm 40 mounted to the first bail ear 34 and a second bail arm 42 mounted to the second bail ear 36. The ends of U-shaped bail wire 14 are fixedly attached, one each to the bail arms 40, 42, so that the bail arms 40, 42 and bail wire 14 are movable as a unit.

The first bail arm 40 is connected to the first bail ear 34 to be pivotable relative thereto about an axis. In like manner, the second bail arm 42 is attached to the second bail ear 36 for pivoting movement relative thereto about a parallel axis. With this arrangement, the bail assembly 38 is pivotable as a unit relative to the rotor 12 about the axes between a cast position and a retrieve position. Through an over-center bias mechanism (not shown) within at least one of the bail ears 34, 36, the bail arms 40, 42, and thus the entire bail assembly 38, are biased into the cast and retrieve positions as the bail assembly 38 approaches each.

Suitable structure for pivotably attaching the bail assembly 38 to the body 30 and for biasing the bail assembly 38 into the cast and retrieve positions is well known in the art. For example, one suitable structure is described in detail in U.S. Pat. No. 5,004,182, to Councilman, which is incorporated herein by reference.

When the bail assembly 38 is in the cast position, line is allowed to freely pay off the spool 16. To change the bail assembly 38 from the cast position to the retrieve position, the crank handle 26 is turned. Through a mechanism shown also in U.S. Pat. No. 5,004,182, rotation of the rotor 12 causes the bail assembly 38 to be deflected out of the cast position and into the retrieve position.

In the transition from the cast position to the retrieve position, the line is guided along an edge of the bail wire 14 and onto a line roller 44. With the reel 10 in the retrieve position, the line extends from the spool 16, around the cylindrical line roller 44, and forwardly from the line roller 44 away from the reel 10.

Operation of the crank handle 26, with the bail assembly 38 in the retrieve position causes the rotor 12 to rotate clockwise about the axis 24 as viewed from the front of the spool 16. This brings the line against the line roller 44 and causes the line to wrap around the spool 16 as the rotor 12 rotates.

Further reference is made to U.S. Pat. Nos. 5,713,529, 4,676,450 and 4,426,045, each incorporated herein by reference, for a more detailed explanation of typical spinning reel operating mechanisms.

Deflection as related to a bail wire is linearly related to the load divided by the product of the multiplicands E and I, where E is the modulus of elasticity (stiffness) of the bail wire material and I is the moment of inertia (related only to the shape of the bail wire's cross section). Most bail designs utilize round stainless steel wire which has a moment of inertia (I) equal to $\frac{1}{4}\pi r^4$. The diameters range from 0.08 to 0.11 in. (2–2.8 mm) resulting in a calculated moment of inertia between $0.20 \times 10^{-5}$ in.$^4$ and $0.72 \times 10^{-5}$ in.$^4$. Elasticity of stainless steel wire ranges generally from 26 to 30 million psi. Thus, the value of E×I as heretofore employed in the spinning reel industry for conventional round stainless steel bail wire ranges from 52–215 lbs.-in.$^2$ With respect to other known bail designs, one bail design utilizing a plastic molded bail transitions from a rectangular shape to an elliptical shape. The moment of inertia for this design varies from approximately $1.4 \times 10^{-4}$ in.$^4$ to $1.0 \times 10^{-2}$ in.$^4$ in one direction and from $0.45 \times 10^{-2}$ in.$^4$ to $2.0 \times 10^{-2}$ in.$^4$ in the other direction where I is calculated for the rectangular section of the bail using the formulas $I_x = (\frac{1}{12})bh^3$ and $I_y = (\frac{1}{12})b^3h$, wherein b is the base length measurement and h is the height measurement, and for the elliptic section of the bail as $I_x = \frac{1}{4}\pi ab^3$ and $I_y = \frac{1}{4}\pi a^3 b$, wherein a is the semi-major axis and b is the semi-minor axis. Since the modulus of elasticity (E) of the plastic is roughly 2 million psi, the value of E×I as heretofore employed in the spinning reel industry for plastic bails ranges from 280–20000 lbs.-in.$^2$ in one direction and 9000–40000 lbs.-in.$^2$ in the other direction.

The conventional bail designs result in a relatively rigid bail wire as evidenced in the value of E×I.

The present invention, however, employs in one aspect a bail wire preselected to possess a product of E×I at or below 45 lbs.-in.$^2$ and, most preferably, around 5 lbs.-in.$^2$. In the most preferred embodiment E is approximately 8 million psi and I is approximately $6.4 \times 10^{-7}$ in.$^4$. The invention encompasses a decreasing range from 45 lbs.-in.$^2$ downward whose criticality is manifest in improved flexibility in the bail wire so the bail wire can more easily avoid bearing the entire force of an accidental load and dampen load forces transmitted to the bail wire support structure while maintaining sufficient stiffness to accommodate the basic functions of a bail wire.

In another aspect of the invention, the inventive bail wire is preselected to possess a heretofore unachievably low weight per unit length. With a density ranging from 0.27–0.29 lbs./in.$^3$ the aforedescribed stainless steel bails have a weight per unit length from approximately $1.3 \times 10^{-3}$ to $2.7 \times 10^{-3}$ lbs./in. The known plastic bails, having a density of approximately 0.04 lbs./in.$^3$ and a cross section varying from 0.03 to 0.09 in.$^2$, possess a weight per unit of length ranging from approximately $1.2 \times 10^{-3}$ to $4.0 \times 10^{-3}$ lbs./in. The inventive bail provided herein, however, has a weight per unit length equal to or less than $1.0 \times 10^{-3}$ lbs./in. and, most preferably, of about $0.7 \times 10^{-3}$ lbs./in. The criticality of this range is manifest in improved reel balance and performance.

Both aspects of the invention are achieved in a nickel-titanium alloy bail wire and, most preferably, a cylindrical nickel-titanium bail wire containing 55–56 weight percent nickel and 44–45 weight percent titanium (about 50 atomic percent each). The inventive bail wire has an optimal diameter of about 0.06 in. and a density of about 0.25 lbs./in.$^3$. Its modulus of elasticity is approximately 8 million psi, and it possesses a moment of inertia of about $6.4 \times 10^{-7}$ in.$^4$. Consequently, in the most preferred inventive bail wire the value of E×I is 5.12 lbs.-in.$^2$ and its weight per unit length is $0.71 \times 10^{-3}$ lbs./in.

The nickel-titanium alloy preferred for the inventive bail is commonly referred to by the acronym NITINOL, which stands for Nickel Titanium Naval Ordinance Laboratory. Nitinol exhibits two unique properties depending upon its particular composition and the manner in which it is prepared, that is, "shape memory" and "superelasticity". The shape memory effect describes the process of restoring the original shape of a plastically deformed sample by heating it to achieve a crystalline phase change known as "thermoelastic martensitic transformation". Below the transition (or transformation) temperature, nitinol has a soft "martensitic" microstructure which is deformable. Heating the material converts it to its high strength, austenitic condition. The transformation to and from the two states can be repeated by subjecting the material to heating and cooling cycles.

On the other hand, the superelasticity effect is achieved when the alloy is stress induced in a temperature range above the transition temperature. This effect is caused by the stress-induced formation of some martensite above its normal temperature. Because it has been formed above its normal temperature, the martensite reverts, i.e., springs back, immediately to undeformed austenite as soon as the stress is removed.

As used herein the term "superelasticity" refers to a resiliency arising from the formation and reversion of stress-induced phase transformations characterized by a crystal lattice distortion.

Importantly, the preferred nitinol bail wire is locked in its austenite form through the temperature variants it will experience during use so that it may exhibit superelasticity. In the most preferred embodiment, the inventive bail wire is constructed of austenitic nitinol having the preferred composition described above, a transition temperature (i.e., an austenitic finish temperature) of $-25°$ C. $\pm 5°$ C. and exhibiting superelasticity in a temperature range of $-25°$ C. to $40°$ C.

Alloy composition, material processing, and ambient temperature are known to greatly effect the super-elastic properties of nickel-titanium compositions. But it is within the skill of the materials science art to produce a wire having the characteristics desired for the present invention. Indeed, reference is made to U.S. Pat. Nos. 4,895,438 and 5,637,089, whose disclosures are incorporated herein in their entirety, in this regard. Particular attention is directed to the '438 patent which discloses a method of fabricating an "optimized elastic" nitinol alloy exhibiting superelasticity over a temperature range of $-25°$ C. to $40°$ C.

Other elements can be added in small amounts to adjust or fine tune the material properties of the preferred composition so long as they do not substantially alter the desired super-elastic property of the inventive bail wire. Excess nickel (to depress the transition temperature and increase yield strength), iron (to lower the transition temperature) and chromium (to decrease the hysteresis and lower the deformation stress of martensite) are common additions. A 0.1 to 2.0 weight percent substitution from the group consisting of Pi, Pd, Co, V, Al and Cu may be utilized as the resulting alloys may exhibit a transformation range of $-120°$ C. to $20°$ C. Because common contaminants such as oxygen and carbon can also shift the transition temperature and degrade mechanical properties, it is also desirable to minimize the amount of these elements, preferably to below 500 ppm.

The shape of the inventive bail wire is set by constraining the nitinol element on a fixture of the desired shape and applying an appropriate heat treatment as is known in the art.

Figure 2:
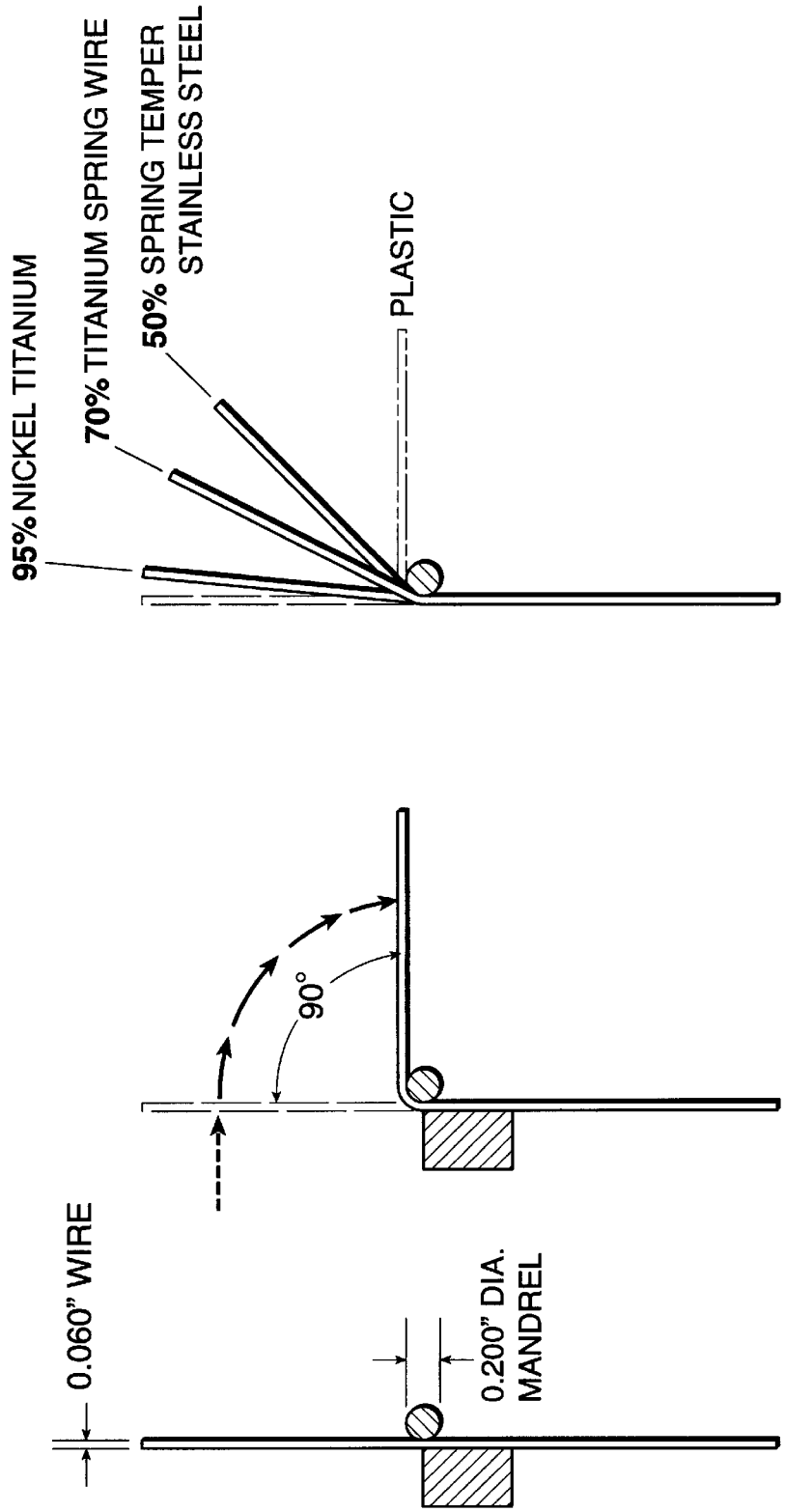
FIG. 2 depicts the elastic recovery characteristics of various compositions.

The advantages of the present invention are further illustrated in FIG. 2, which demonstrates the flexibility of the preferred bail wire composition as compared to stainless steel wire, titanium spring wire and plastic. When a 0.06 inch diameter cylindrical length of each type material is bent at a 90 degree angle around a 0.200 inch diameter mandrel, the nickel titanium wire exhibits an elastic recovery percentage of approximately 95% as compared to 50% for stainless steel, 70% for titanium spring wire and 0% for plastic.

While the invention has been described with a certain degree of particularity, it is understood that the invention is not limited to the embodiment(s) set for herein for purposes of exemplification, but is to be limited only by the scope of the attached claim or claims, including the full range of equivalency to which each element thereof is entitled.

What is claimed is:

1. In a spinning-type fishing reel having a housing with an oscillating spool at its forward end, a crank handle mounted on the housing, a rotor mounted for rotation about the spool by cooperative movement of the handle, and a bail assembly that wraps fishing line onto the oscillating spool, the improvement comprising a bail wire having a modulus of elasticity (E) and a moment of inertia (1) whose product (E×I) is equal to or less than 45 lbs.-in.$^2$ and possessing superelasticity in an effective temperature range of use.

2. A spinning-type fishing reel according to claim 1 wherein the product (E×I) is approximately 5 lbs.-in.$^2$.

3. A spinning-type fishing reel according to claim 2 wherein E is approximately 8 million psi and I is approximately $6.4 \times 10^{-7}$ in.$^4$.

4. A spinning-type fishing reel according to claim 3 wherein the bail wire comprises a nickel-titanium alloy locked in its austenite form throughout the effective temperature range of use.

5. A spinning-type fishing reel according to claim 4 wherein the alloy consists essentially of 55–56 weight percent nickel and 44–45 weight percent titanium.

6. A spinning-type fishing reel according to claim 4 wherein the alloy has a transition temperature of about −25° C.

7. A spinning-type fishing reel according to claim 4 wherein the alloy exhibits superelasticity in a temperature range of −25° C. to 40° C.

8. A spinning-type fishing reel according to claim 4 wherein the bail wire is cylindrical in shape.

9. A spinning-type fishing reel according to claim 8 wherein the bail wire has a diameter of about 0.06 in.

10. A spinning-type fishing reel according to claim 1 wherein the bail wire further has a weight per unit length equal to or less than $1.0 \times 10^{-3}$ lbs./in.

11. A spinning-type fishing reel according to claim 10 wherein the weight per unit length is about $0.7 \times 10^{-3}$ lbs./in.

12. In a spinning-type fishing reel having a housing with an oscillating spool at its forward end, a crank handle mounted on the housing, a rotor mounted for rotation about the spool by cooperative movement of the handle, and a bail assembly that wraps fishing line onto the oscillating spool, the improvement comprising a bail wire having a weight per unit length equal to or less than $1.0 \times 10^{-3}$ lbs./in. and possessing superelasticity in an effective temperature range of use.

13. A spinning-type fishing reel according to claim 12 wherein the weight per unit length is about $0.7 \times 10^{-3}$ lbs./in.

14. A spinning-type fishing reel according to claim 12 wherein the bail wire comprises a nickel-titanium alloy locked in its austenite form throughout the effective temperature range of use.

15. A spinning-type fishing reel according to claim 14 wherein the alloy consists essentially of 55–56 weight percent nickel and 44–45 weight percent titanium.

16. A spinning-type fishing reel according to claim 14 wherein the alloy has an transition temperature of about −25°.

17. A spinning-type fishing reel according to claim 14 wherein the alloy exhibits superelasticity in a temperature range of −25° C. to 40° C.

18. A spinning-type fishing reel according to claim 14 wherein the bail wire is cylindrical in shape.

19. A spinning-type fishing reel according to claim 18 wherein the bail wire has a diameter of about 0.06 in.

20. In a spinning-type fishing reel having a housing with an oscillating spool at its forward end, a crank handle mounted on the housing, a rotor mounted for rotation about the spool by cooperative movement of the handle, and a bail assembly that wraps fishing line onto the oscillating spool, the improvement comprising a bail wire having superelasticity throughout a temperature range of from −25° C. to 40° C.

21. A spinning-type fishing reel according to claim 20 wherein the bail wire comprises a nickel-titanium alloy locked in its austenite form throughout the specified temperature range.

22. A spinning-type fishing reel according to claim 21 wherein the alloy consists essentially of 55–56 weight percent nickel and 44–45 weight percent titanium.

* * * * *

(12) EX PARTE REEXAMINATION CERTIFICATE (4851st)
United States Patent
Cockerham et al.

(10) Number: US 6,076,756 C1
(45) Certificate Issued: Sep. 23, 2003

(54) SUPERELASTIC LIGHTWEIGHT BAIL WIRE FOR SPINNING FISHING REELS

(75) Inventors: Rayford A. Cockerham, Broken Arrow, OK (US); Carl J. Berendt, Afton, OK (US); William B. Johnson, Tulsa, OK (US)

(73) Assignee: W. C. Bradley/Zebco Holdings, Inc., Columbus, GA (US)

Reexamination Request:
No. 90/006,275, Apr. 30, 2002

Reexamination Certificate for:
Patent No.: 6,076,756
Issued: Jun. 20, 2000
Appl. No.: 09/311,945
Filed: May 14, 1999

(51) Int. Cl.$^7$ ............................................. A01K 89/01
(52) U.S. Cl. ..................... 242/231; 428/364; 428/379

(56) References Cited

U.S. PATENT DOCUMENTS 6,266,914 B1   7/2001   Johnson et al. ............ 43/42.13

FOREIGN PATENT DOCUMENTS

| JP | 10-276629 | 10/1988 | .......... A01K/89/01 |
| WO | WO 98/24309 | 12/1997 | .......... A01K/75/00 |

*Primary Examiner*—Emmanuel M. Marcelo

(57) ABSTRACT

The present invention provides a super-elastic, lightweight bail wire in combination with a bail assembly for use in connection with spinning-type fishing reels. In one preferred aspect, the bail wire has a modulus of elasticity (E) and a moment of inertia (I) whose product (ExI) is equal to or less than 45 lbs.-in.$^2$. In another preferred aspect, the bail wire has a weight per unit length equal to or less than $1.0 \times 10^{-3}$ lbs./in. Both aspects of the invention are achieved in an austenitic nickel-titanium alloy bail wire.

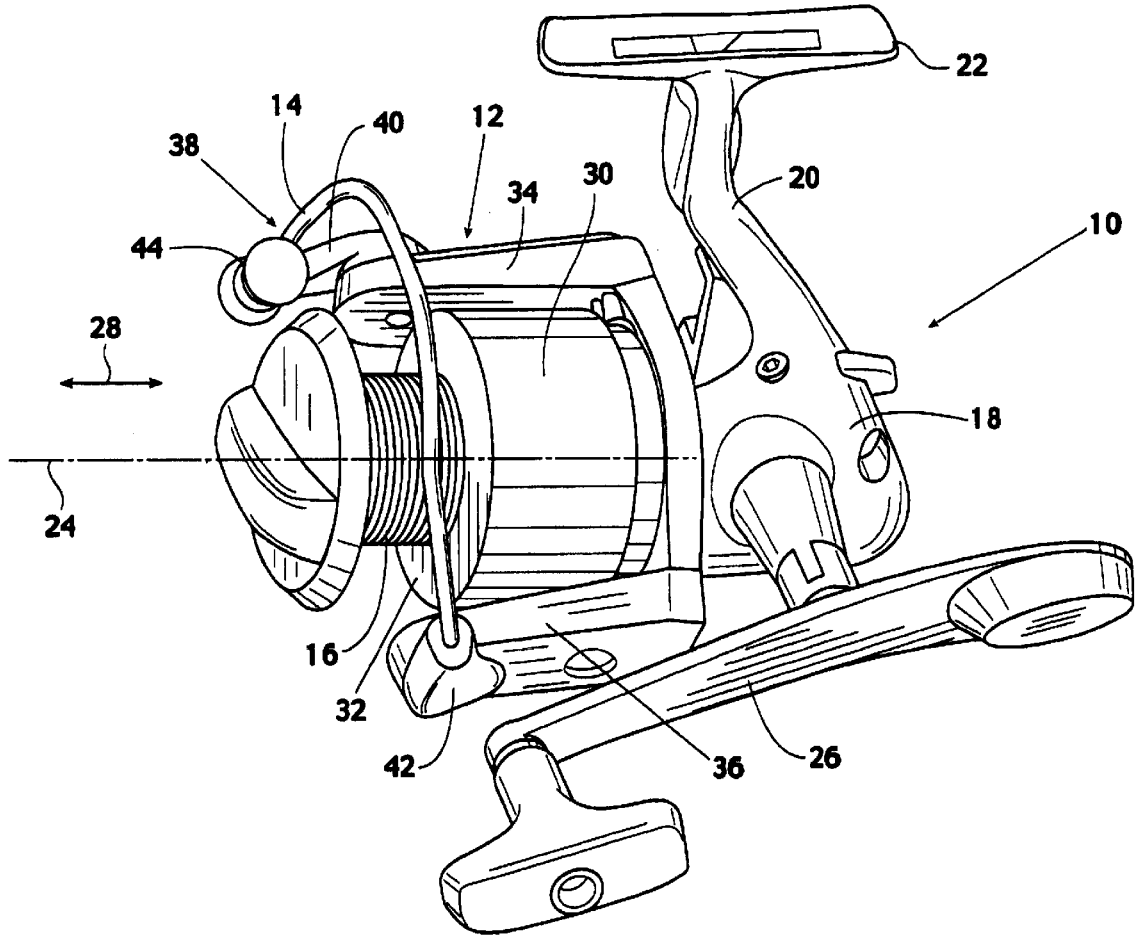

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–22 is confirmed.

* * * * *